(12) United States Patent  (10) Patent No.: US 6,505,569 B1
Richard  (45) Date of Patent: Jan. 14, 2003

(54) SEEDER AIRFLOW CONTROL SYSTEM

(76) Inventor: Leroy J. Richard, 734-13th Ave. East, West Fargo, ND (US) 58078

( * ) Notice: Subject to any disclaimer, the term of this patent is extended or adjusted under 35 U.S.C. 154(b) by 0 days.

(21) Appl. No.: 09/902,909

(22) Filed: Jul. 9, 2001

(51) Int. Cl.[7] ................................................ A01C 7/04
(52) U.S. Cl. ..................................................... 111/174
(58) Field of Search .............................. 111/14, 34, 79, 111/170, 174, 175, 176, 179, 185, 200, 903, 904; 221/211, 278, 208; 406/106, 83

(56) References Cited

U.S. PATENT DOCUMENTS

| | | | | |
|---|---|---|---|---|
| 5,379,706 A | * | 1/1995 | Gage et al. ................... | 111/174 |
| 6,145,455 A | * | 11/2000 | Gust et al. .................... | 111/178 |
| 6,296,425 B1 | * | 10/2001 | Memory et al. ............. | 406/120 |
| 6,367,396 B1 | * | 4/2002 | Meyer ......................... | 111/176 |

* cited by examiner

Primary Examiner—Robert E. Pezzuto
(74) Attorney, Agent, or Firm—Michael S. Neustel

(57) ABSTRACT

A seeder airflow control system for accurately placing seeds in a furrow at approximately zero velocity with respect to the ground surface. The seeder airflow control system includes a first tube connected to a seed singulator, a second tube having a plurality of openings movably positioned about the first tube, and an actuator connected between the first tube and the second tube for adjusting the relative position of the tubes with respect to one another. The second tube is fluidly connected to a seed delivery tube that has a lower segment that is positionable adjacent and parallel to the bottom of a furrow to deliver the seed at a velocity of approximately zero with respect to the ground surface. When the tubes are extended away from one another, an increased number of the openings within the second tube are exposed thereby decreasing the air pressure and velocity through the delivery tube. When the tubes are contracted toward one another, a decreased number of the openings within the second tube are exposed thereby increasing the air pressure and velocity through the delivery tube.

20 Claims, 5 Drawing Sheets

SEEDER AIRFLOW CONTROL SYSTEM

BACKGROUND OF THE INVENTION

1. Field of the Invention

The present invention relates generally to air seeder equipment and more specifically it relates to a seeder airflow control system for accurately placing seeds in a furrow at approximately zero velocity with respect to the ground surface.

Research has consistently shown that accurate placement of plants within a field produces the highest possible yields, quality and uniformity within various types of crops. However, most planter devices do not provide accurate seed placement within the furrow created by an opener. The seeds are placed at unequal distances thereby causing some seeds to be closer to others. Contributing to this problem is seed movement after release from the planter because of the forward motion of the planter depositing the seed on stationary ground. Because some of the plants are growing closer to one another, their overall growth is stunted because of lack of nutrients, water and sunlight. Hence, there is a need for a planter device that accurately places seeds within a furrow for increasing crop yields.

2. Description of the Prior Art

Planter devices have been in use for years. Typically, a planter device includes a storage bin for storage of the seed. Conventional planter devices utilize a singulation system connected to the storage bin with a length of tube generally transporting the singulated seed to the furrow. Air seeders utilize a constant flow of air through the tubing to transport the seed front the storage bin through the singulation system to exit through the length of tube.

Unfortunately, conventional planter devices do not provide an accurate placement of seeds within the furrow. The seed kernels often times exits the delivery tube to engage the ground surface at approximately the velocity of the planter device causing a bounce and roll effect. This movement of the seed is undesirable since it contributes to misplacement and uneven placement of the seeds within the open furrow.

While these devices may be suitable for the particular purpose to which they address, they are not as suitable for accurately placing seeds in a furrow at approximately zero velocity with respect to the ground surface. Conventional seeder devices are designed to accurate place seed kernels within a furrow.

In these respects, the seeder airflow control system according to the present invention substantially departs from the conventional concepts and designs of the prior art, and in so doing provides an apparatus primarily developed for the purpose of accurately placing seeds in a furrow at approximately zero velocity with respect to the ground surface.

SUMMARY OF THE INVENTION

In view of the foregoing disadvantages inherent in the known types of planter devices now present in the prior art, the present invention provides a new seeder airflow control system construction wherein the same can be utilized for accurately placing seeds in a furrow at approximately zero velocity with respect to the ground surface.

The general purpose of the present invention, which will be described subsequently in greater detail, is to provide a new seeder airflow control system that has many of the advantages of the seeder devices mentioned heretofore and many novel features that result in a new seeder airflow control system which is not anticipated, rendered obvious, suggested, or even implied by any of the prior art seeder devices, either alone or in any combination thereof.

To attain this, the present invention generally comprises a first tube connected to a seed singulator, a second tube having a plurality of openings movably positioned about the first tube, and an actuator connected between the first tube and the second tube for adjusting the relative position of the tubes with respect to one another. The second tube is fluidly connected to a seed delivery tube that has a lower segment that is positionable adjacent and parallel to the bottom of a furrow to deliver the seed at a velocity of approximately zero with respect to the ground surface. When the tubes are extended away from one another, an increased number of the openings within the second tube are exposed thereby decreasing the air pressure and velocity through the delivery tube. When the tubes are contracted toward one another, a decreased number of the openings within the second tube are exposed thereby increasing the air pressure and velocity through the delivery tube.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a seeder airflow control system that will overcome the shortcomings of the prior art devices.

A second object is to provide a seeder airflow control system for accurately placing seeds in a furrow at approximately zero velocity with respect to the ground surface.

Another object is to provide a seeder airflow control system that provides uniform and accurate placement of seed kernels within a furrow.

An additional object is to provide a seeder airflow control system that increases crop growth, yield, quality and uniformity.

Another object is to provide a seeder airflow control system that reduces seed movement after being placed within the open furrow.

A further object is to provide a seeder airflow control system that reduces the vertical distance a seed has to travel uncontrollably prior to being placed within a furrow.

Another object is to provide a seeder airflow control system that delivers the seed into the furrow at approximately zero velocity instead of the velocity of the planter.

An additional object is to provide a seeder airflow control system that virtually eliminates the planter speed as a factor in determining seed placement.

A further object is to provide a seeder airflow control system that provides increased crop uniformity for providing easier harvesting and drying.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
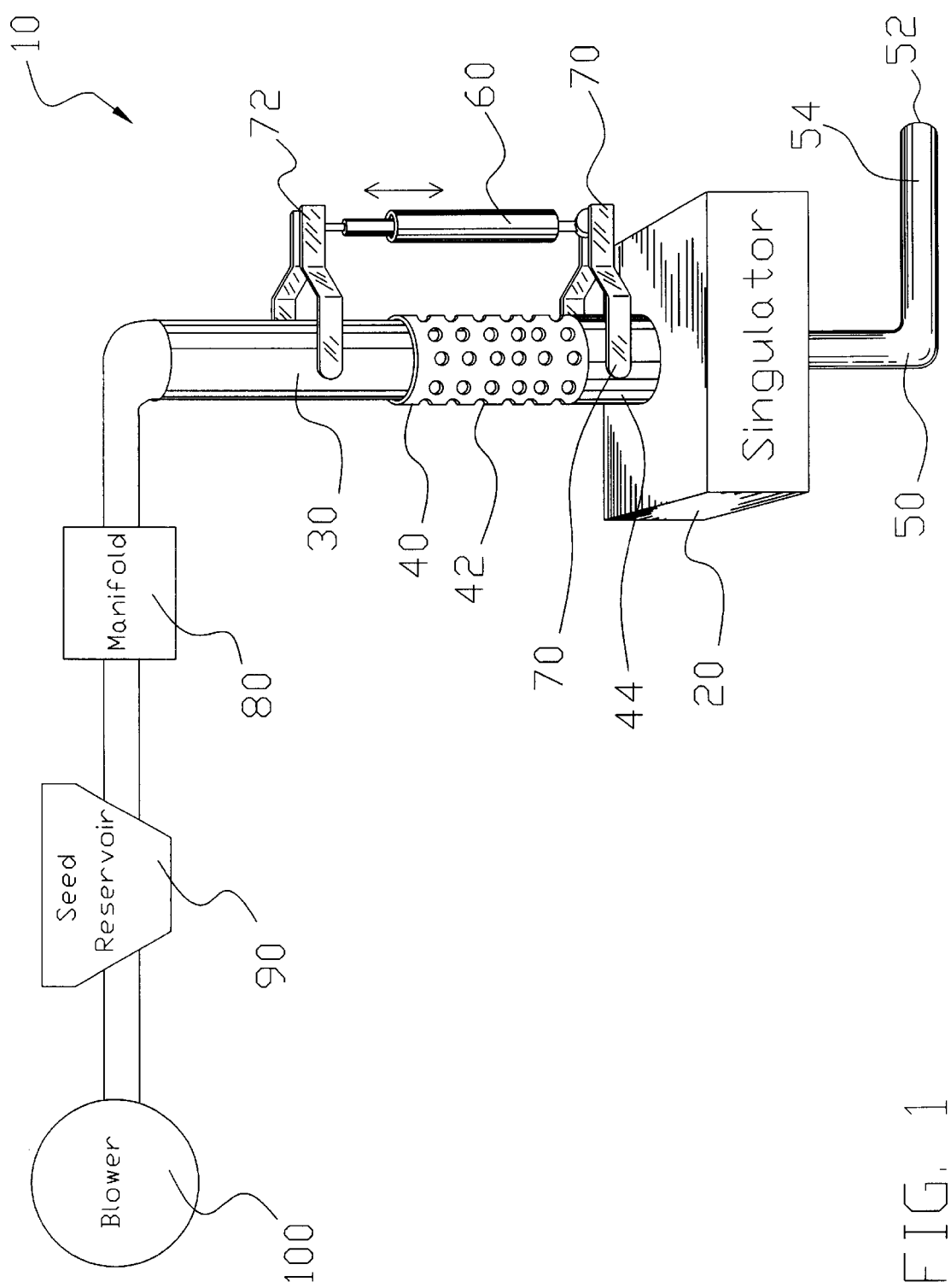
FIG. 1 is an upper perspective view of the present invention.

Turning now descriptively to the drawings, in which similar reference characters denote similar elements throughout the several views, FIGS. 1 through 5 illustrate a seeder airflow control system 10, which comprises a first tube 30 connected to a seed singulator 20, a second tube 40 having a plurality of openings 42 movably positioned about the first tube 30, and an actuator 60 connected between the first tube 30 and the second tube 40 for adjusting the relative position of the tubes with respect to one another. The second tube 40 is fluidly connected to a seed delivery tube 50 that has a lower segment 54 that is positionable adjacent and parallel to the bottom of a furrow 14 to deliver the seed at a velocity of approximately zero with respect to the ground surface. When the tubes 30, 40 are extended away from one another, an increased number of the openings 42 within the second tube 40 are exposed thereby decreasing the air pressure and velocity through the delivery tube 50. When the tubes 30, 40 are contracted toward one another, a decreased number of the openings 42 within the second tube 40 are exposed thereby increasing the air pressure and velocity through the delivery tube 50.

As shown in FIG. 1 of the drawings, a blower 100 is fluidly connected to a seed reservoir 90 for providing air pressure for distributing seeds 12 as is conventional within the planter industry. A manifold 80 or similar device is fluidly connected to the seed reservoir 90 for separating the seeds between the various number of rows to be planted. It can be appreciated that the blower 100, seed reservoir 90 and manifold 80 are commonly utilized within the planter industry and may be comprised of any well-known structure known in the art. It can also be appreciated that various planter frames may be utilized to operate the present invention that are well-known in the art. Also, various devices that may utilized to create a furrow 14 in front of the delivery tube 50 may be utilized such as but not limited to double-disc openers.

Further discussion of the present invention will involve describing a single row unit structure. It can be appreciated that in practice that there will be a plurality of row units utilized within the planter device. As shown in FIG. 1 of the drawings, the first tube 30 is fluidly connected to the manifold 80 or similar device for receiving the seed. The first tube 30 is preferably constructed of a solid tubular structure however various apertures may extend through the first tube 30. The first tube 30 is comprised of an elongate structure as shown in FIGS. 1 through 4 of the drawings.

Figure 2:
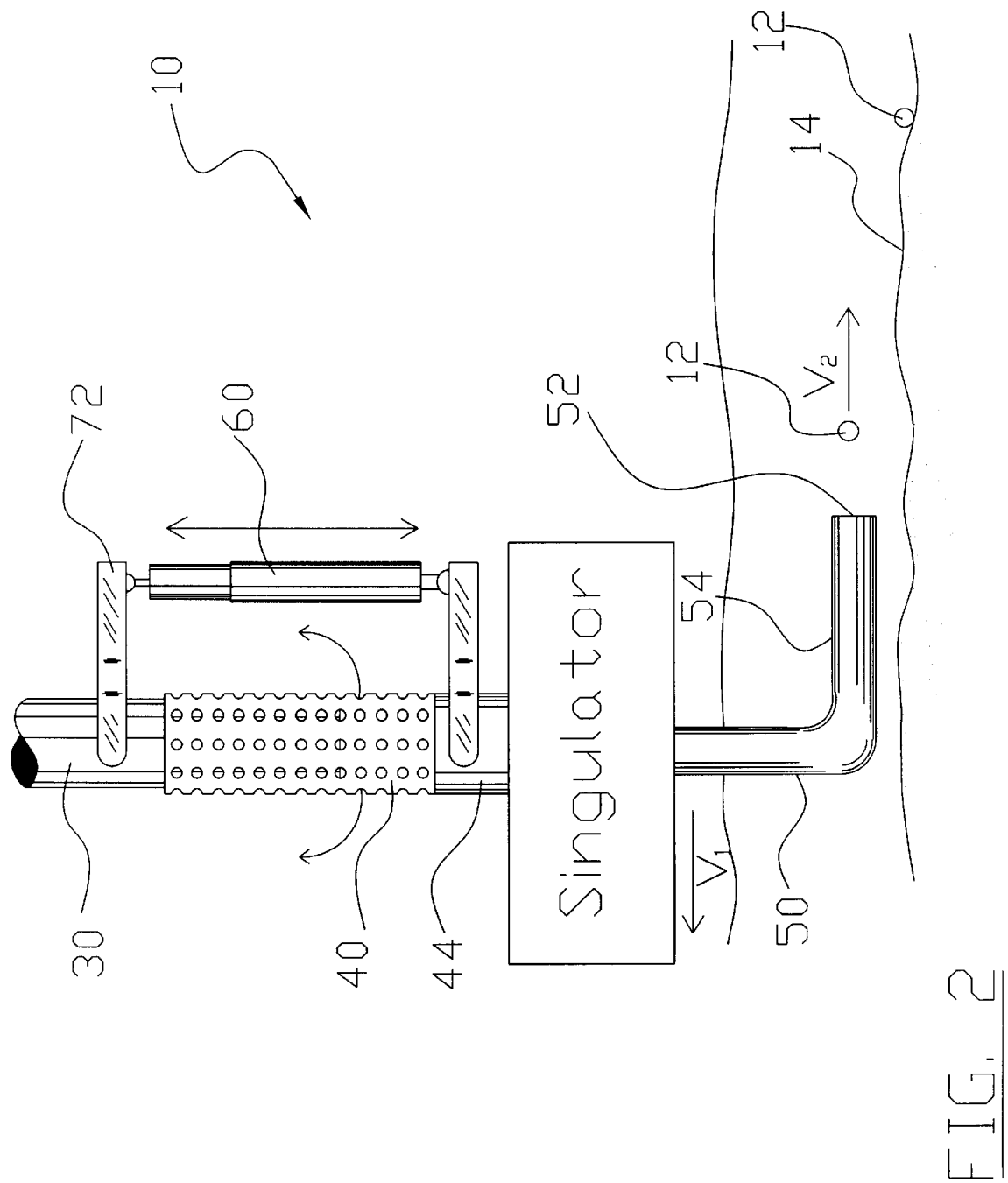
FIG. 2 is a side view of the present invention illustrating the airflow into the first tube and a portion of the airflow being emitted via the openings within the second tube.
Figure 3:
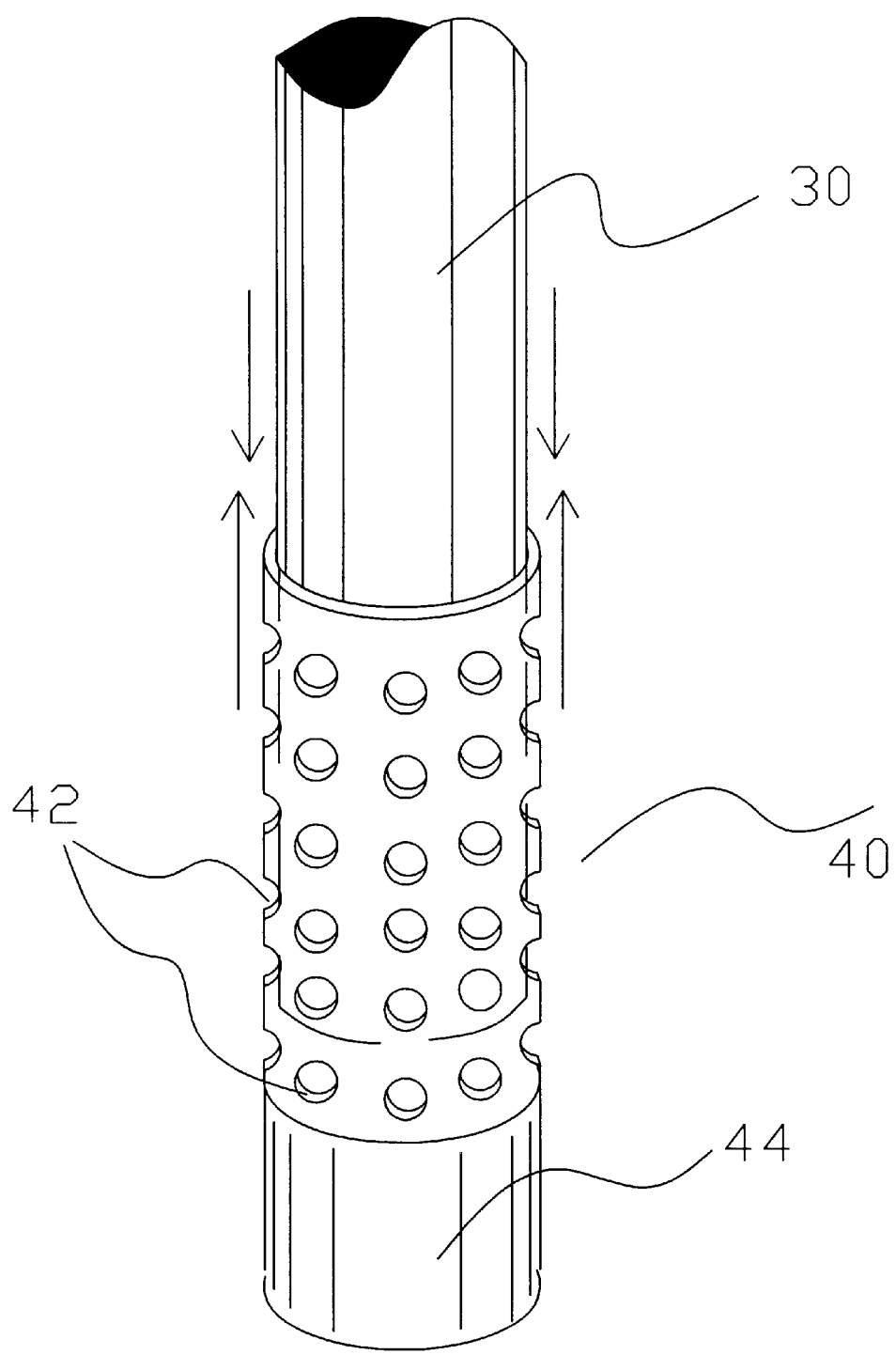
FIG. 3 is a magnified upper perspective view of the first tube movably positioned within the second tube with the tubes moving toward one another effectively blocking a portion of the openings within the second tube.
Figure 4:
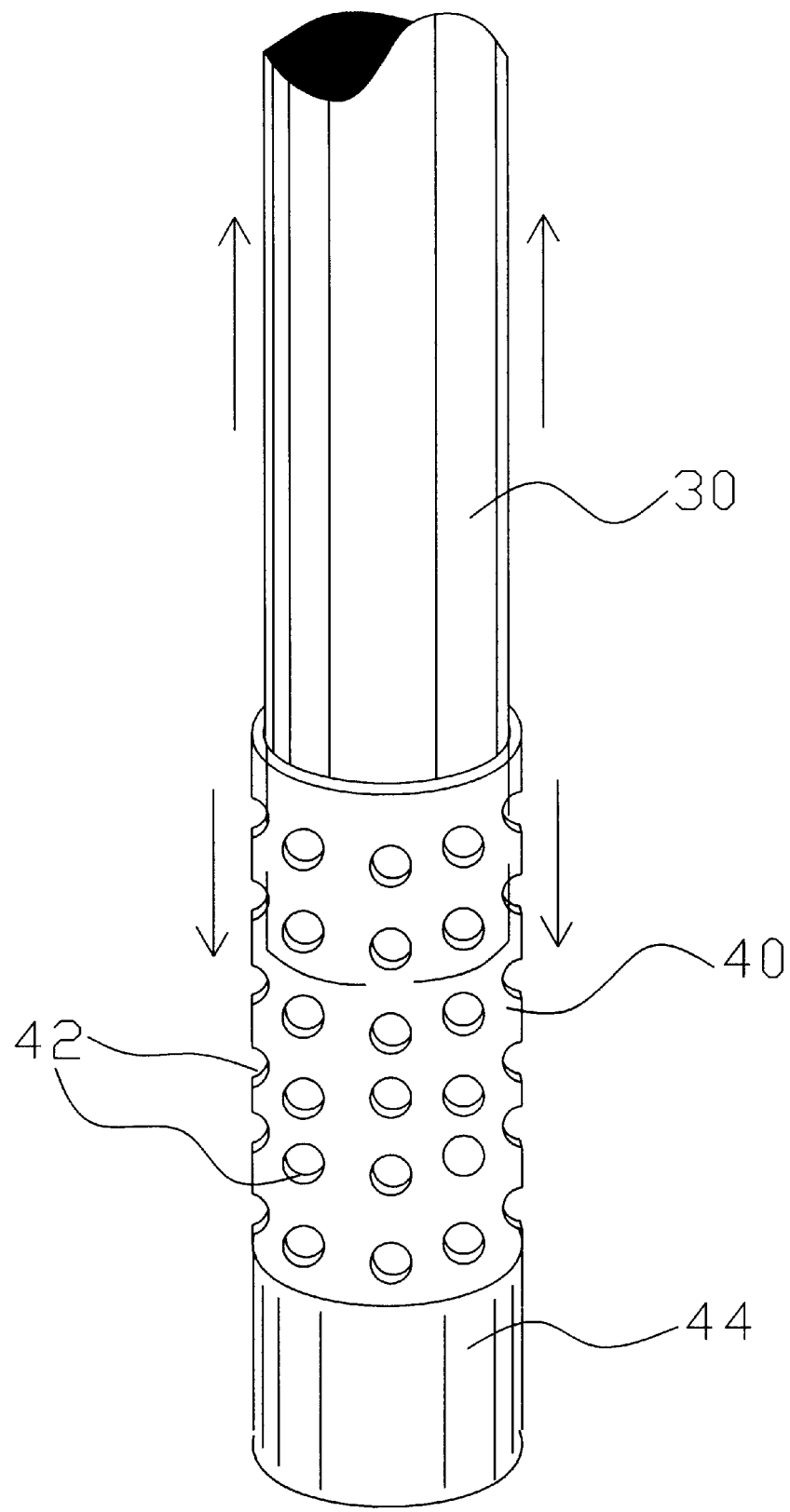
FIG. 4 is a magnified upper perspective view of the first tube movably positioned within the second tube with the tube moving away from one another effectively exposing a portion of the openings within the second tube.

As shown in FIGS. 1 through 4 of the drawings, the second tube 40 is comprised of an elongate structure containing a plurality of openings 42 within. The second tube 40 is formed to be movably positioned about the first tube 30 as best shown in FIGS. 3 and 4 of the drawings. It can be appreciated that the second tube 40 may be positioned within the lumen of the first tube 30 to achieve the same desired effect. The plurality of openings 42 may be comprised of various sizes, structures, shapes and designs as can be appreciated. The second tube 40 contains a solid portion 44 after the plurality of openings 42 for receiving the seed 12 and delivering the seed 12 to the singulator 20.

As shown in FIGS. 1 and 2 of the drawings, a lower bracket 70 is attached to the second tube 40 and an upper bracket 72 is attached to the first tube 30. At least one actuator 60 is attached to the brackets 70, 72 for extending and contracting the tubes 30, 40 with respect to one another as shown in FIGS. 1 through 4 of the drawings. The actuator 60 may be comprised of any well-known actuator 60 device such as but not limited to a hydraulic cylinder or solenoid. The actuator 60 is capable of extending and contracting the first tube 30 and the second tube 40 in various desired positions relative to the velocity of the planter frame with respect to the ground surface. The actuator 60 may be automatically controlled based upon the velocity of the tractor and planter implement with respect to the ground surface or manually controlled. Velocity sensors and electronic equipment to control actuators 60 based upon a velocity are well established in the planter industry.

As shown in FIG. 4 of the drawings, when the tubes 30, 40 are extended away from one another, an increased number of the openings 42 within the second tube 40 are exposed thereby decreasing the air pressure and velocity through the delivery tube 50. When more openings 42 within the second tube 40 are exposed, an increased volume of air from within the first tube 30 is able to escape through the openings 42 thereby reducing the effective air pressure and velocity within the second tube 40. When the tractor and planter implement velocity is lowered, an increased number of openings 42 are exposed to reduce the velocity V2 of the air and seed 12 being emitted from the delivery tube 50.

As shown in FIG. 3 of the drawings, when the tubes 30, 40 are contracted toward one another, a decreased number of the openings 42 within the second tube 40 are exposed thereby increasing the air pressure and velocity through the delivery tube 50. When fewer openings 42 within the second tube 40 are exposed, an increased volume of air from within the first tube 30 is able to flow through the second tube 40 (less air escapes through the openings 42) thereby increasing the effective air pressure and velocity within the second tube 40. When the tractor and planter implement velocity is increased, a fewer number of openings 42 are exposed to increase the velocity V2 of the air and seed 12 being emitted from the delivery tube 50.

Figure 5:
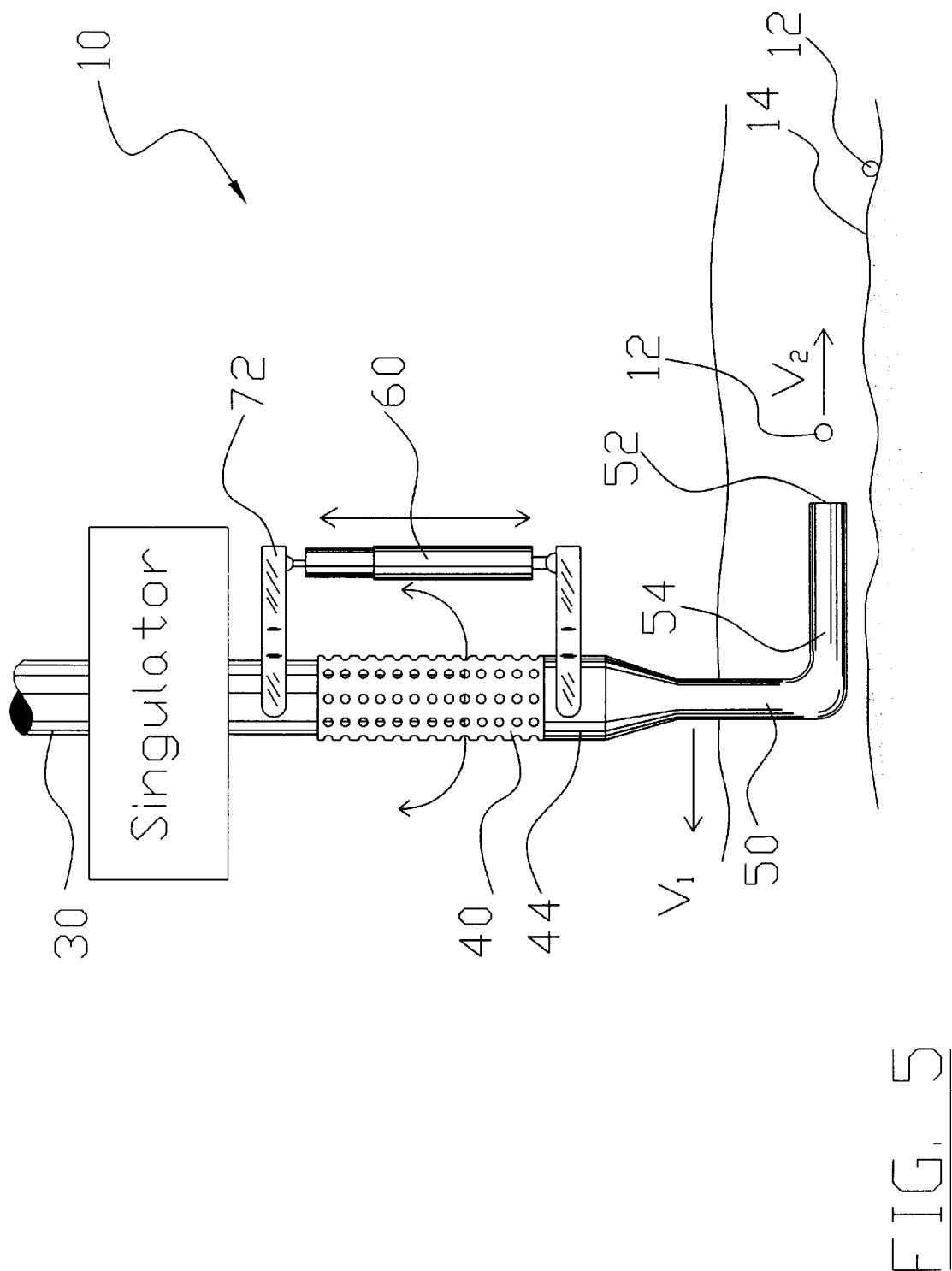
FIG. 5 is a side view of the present invention illustrating the singulator positioned above the second tube.

As shown in FIGS. 1 and 2 of the drawings, a seed singulator 20 or similar device is fluidly connected to the second tube 40 opposite of the first tube 30. The seed singulator 20 singulates the seeds 12 to be dispersed through the delivery tube 50. As shown in FIG. 5 of the drawings, the singulator 20 may be fluidly connected above the first tube 30 instead of below the second tube 40 in an alternative embodiment. It can also be appreciated that a singulator 20 may not be utilized within the present invention.

As shown in FIGS. 1 and 2 of the drawings, the delivery tube 50 is fluidly connected to the seed singulator 20 for receiving the singulated seeds 12. The delivery tube 50 has a lower segment 54 that is substantially parallel to the ground surface and positioned close to the base within the furrow 14 as shown in FIG. 2 of the drawings. The discharge port 52 within the delivery tube 50 is positioned opposite of the forward movement of the planter implement and tractor so that when the seed is discharged through the discharge port 52 the velocity V2 of the seed is approximately opposite of the forward velocity of the planter implement V1 thereby effectively forming a zero velocity with respect to the ground surface to prevent rolling and movement of the seed after deposited within the furrow 14. The discharge port 52 is further positioned rearwardly from the double-disc opener so that the soil surrounding the furrow 14 begins closing upon the furrow 14 to assist in further preventing movement of the seed after being discharged.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A seeder airflow control system for use within an air planter implement having a blower and a seed reservoir, comprising:

a first tube;

a second tube slidably positioned about said first tube;

a delivery tube having a discharge port fluidly connected to said second tube for delivering seed to a furrow, wherein said discharge port is directed in a direction opposite of a velocity (V1) of said air planter implement;

at least one opening within said second tube for allowing a portion of air flow from said first tube to escape through thereof, wherein a portion of said first tube is positionable adjacent said at least one opening for controlling the escape of air through said at least one opening; and at least one actuator connected between said first tube and said second tube for positioning said tubes within a desired respective position depending upon the desired velocity (V2) of said seed to be discharged from said discharge port.

2. The seeder airflow control system of claim 1, including a seed singulator fluidly positioned between said second tube and said delivery tube.

3. The seeder airflow control system of claim 1, including a seed singulator fluidly positioned within said first tube.

4. The seeder airflow control system of claim 1, wherein said second tube includes a solid portion opposite of said at least one opening.

5. The seeder airflow control system of claim 1, wherein said at least one opening is comprised of a plurality of openings.

6. The seeder airflow control system of claim 5, wherein said plurality of openings are positioned about an entire radial portion of said second tube.

7. The seeder airflow control system of claim 6, wherein said plurality of openings are aligned in horizontal rows.

8. The seeder airflow control system of claim 1, including a lower bracket attached to said second tube and an upper bracket attached to said first tube, wherein said at least one actuator is attached between said brackets.

9. The seeder airflow control system of claim 1, wherein said at least one actuator is automatically controlled with respect to said velocity (V1) of said air planter implement, wherein when said velocity (V1) is increased said actuator is manipulated to contract said first tube with respect to said second tube effectively closing an increasing area of said at least one opening, and wherein when said velocity (V1) is decreased said actuator is manipulated to extend said first tube with. respect to said second tube effectively exposing an increasing area of said at least one opening.

10. The seeder airflow control system of claim 1, wherein said first tube has an outer diameter slightly smaller than an inner diameter of said second tube.

11. A seeder airflow control system for use within an air planter implement having a blower and a seed reservoir, comprising:

a first tube;

a second tube slidably positioned within said first tube;

a delivery tube having a discharge port fluidly connected to said second tube for delivering seed to a furrow, wherein said discharge port is directed in a direction opposite of a velocity (V1) of said air planter implement;

at least one opening within said second tube for allowing a portion of air flow from said first tube to escape through thereof, wherein a portion of said first tube is positionable adjacent said at least one opening for controlling the escape of air through said at least one opening; and at least one actuator connected between said first tube and said second tube for positioning said tubes within a desired respective position depending upon the desired velocity (V2) of said seed to be discharged from said discharge port.

12. The seeder airflow control system of claim 11, including a seed singulator fluidly positioned between said second tube and said delivery tube.

13. The seeder airflow control system of claim 11, including a seed singulator fluidly positioned within said first tube.

14. The seeder airflow control system of claim 11, wherein said second tube includes a solid portion opposite of said at least one opening.

15. The seeder airflow control system of claim 11, wherein said at least one opening is comprised of a plurality of openings.

16. The seeder airflow control system of claim 15, wherein said plurality of openings are positioned about an entire radial portion of said second tube.

17. The seeder airflow control system of claim 16, wherein said plurality of openings are aligned in horizontal rows.

18. The seeder airflow control system of claim 11, including a lower bracket attached to said second tube and an upper bracket attached to said first tube, wherein said at least one actuator is attached between said brackets.

19. The seeder airflow control system of claim 11, wherein said at least one actuator is automatically controlled with respect to said velocity (V1) of said air planter implement, wherein when said velocity (V1) is increased said actuator is manipulated to contract said first tube with respect to said second tube effectively closing an increasing area of said at least one opening, and wherein when said velocity (V1) is decreased said actuator is manipulated to extend said first tube with respect to said second tube effectively exposing an increasing area of said at least one opening.

20. The seeder airflow control system of claim 11, wherein said first tube has an inner diameter slightly larger than an outer diameter of said second tube.

* * * * *